(12) United States Patent
Ritland

(10) Patent No.: US 6,886,345 B2
(45) Date of Patent: May 3, 2005

(54) ELECTROSTATIC EVAPORATIVE COOLING SYSTEM

(75) Inventor: Paul David Ritland, Longwood, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/619,331

(22) Filed: Jul. 14, 2003

(65) Prior Publication Data

US 2005/0011198 A1    Jan. 20, 2005

(51) Int. Cl.[7] ............................................. F02C 3/30
(52) U.S. Cl. ........................................ 60/775; 60/728
(58) Field of Search ..................... 60/775, 39.3, 728; 415/116

(56) References Cited

U.S. PATENT DOCUMENTS

| | | |
|---|---|---|
| 3,937,401 A | 2/1976 | Luderer et al. |
| 4,341,347 A | 7/1982 | DeVittorio |
| 4,666,089 A | 5/1987 | Inculet |
| 4,763,424 A | 8/1988 | Taylor et al. |
| 4,854,500 A | 8/1989 | Mathai et al. |
| 5,009,367 A | 4/1991 | Nielsen |
| 5,044,564 A | 9/1991 | Sickles |
| 5,704,554 A | 1/1998 | Cooper et al. |
| 5,765,761 A | 6/1998 | Law et al. |
| 5,873,523 A | 2/1999 | Gomez et al. |
| 5,881,647 A | 3/1999 | Siler et al. |
| 6,138,922 A | 10/2000 | Hartman et al. |
| 6,402,063 B1 | 6/2002 | Turner et al. |
| 6,484,507 B1 | 11/2002 | Pradt |
| 6,553,768 B1 * | 4/2003 | Trewin et al. ............... 60/772 |
| 2002/0063176 A1 | 5/2002 | Leuteritz et al. |
| 2003/0015594 A1 | 1/2003 | Kelly |

* cited by examiner

Primary Examiner—Ehud Gartenberg

(57) ABSTRACT

An evaporative cooling system for applying an electrical charge to a plurality of droplets in an intake airstream of a turbine engine to increase the propensity of the droplets to evaporate before the droplets reach the compressor. The evaporative cooling system may include one or more fluid emitting devices for producing a plurality of droplets and may include one or more electrodes for applying an electrical charge to the plurality of droplets. The evaporative cooling system may also apply an electrical charge to one or more baffles positioned downstream of the fluid emitting devices and upstream from the compressor to collect droplets that have not evaporated before the droplets reach the compressor.

19 Claims, 2 Drawing Sheets

ELECTROSTATIC EVAPORATIVE COOLING SYSTEM

FIELD OF THE INVENTION

This invention is directed generally to turbine engines, and more particularly to evaporative cooling systems for turbine engines.

BACKGROUND

Gas turbine engines typically are formed from a compressor, a combustor positioned downstream from the compressor, and a plurality of turbine blades coupled to a rotatable disc positioned downstream from the combustor. The compressor receives air from an inlet and compresses the air before passing the compressed air to the combustor. In the combustor, the compressed air is mixed with fuel, and the mixture is ignited. The combustion gases produced in the compressor are passed to the turbine blades and cause the turbine blades to rotate. The combustion gases are then expelled from the turbine engine through an exhaust outlet at the rear of the turbine engine.

Some gas turbine engines use evaporative cooling systems to cool the intake air upstream of the compressor. Cooling the intake air improves the power and efficiency of the turbine engines and can, in some instances, reduce emissions of, for instance, $NO_x$. Conventional evaporative cooling systems often include an array of nozzles positioned upstream of a compressor in an air intake duct. The nozzles are positioned to spray a cooling fluid, which is often water, in a downstream direction and generally parallel to a longitudinal axis of the duct. The nozzles often produce a plurality of droplets having a Dv90 between about 25 microns and about 40 microns. Dv90 is a measurement of a drop diameter, whereby 90 percent of a total fluid volume of fluid is composed of droplets less than the measurement. For instance, one particular nozzle may consistently produce droplets having a Dv90 measurement of about 28 microns at a distance of 3 inches from the nozzle. However, at distances between 6 and 12 inches from the nozzle, the nozzle may produce droplets having a Dv90 of about 75 microns due to agglomeration.

Fine spray droplets have a tendency to agglomerate with each other while suspended in air and on surfaces. Agglomeration increases a droplet's overall size and reduces the amount of surface area relative to droplet mass, thereby increasing the time required for the droplet to evaporate. Using a simple evaporation model based on an evaporation rate being directly proportional to a surface area of a spherical droplet leads to a conclusion that the time necessary for complete evaporation of a droplet to occur is directly proportional to a diameter of a droplet squared. Using this model, the amount of time necessary for a droplet having a diameter of about 75 microns to evaporate is about 9 times greater than the amount of time needed for a droplet having a diameter of about 25 microns to evaporate.

Conventional turbine engines often do not have sufficient residence time in a duct upstream of a compressor to allow all of the droplets emitted from the array of nozzles to evaporate before entering the compressor. Thus, droplets often enter the compressor, which can cause erosion of various components of the compressor. Thus, a need exists for a more efficient evaporative cooling system for reducing the temperature of air flowing into a turbine engine while preventing at least a substantial portion of the droplets from entering a compressor of the turbine engine.

SUMMARY OF THE INVENTION

This invention relates to an evaporative cooling system usable in turbine engines for cooling intake air without providing liquid moisture laden air to the compressor of the turbine engine. The evaporative cooling system includes one or more electrodes for applying an electrical charge to a plurality of droplets to prevent the droplets from agglomerating and either settling out of the air flowing through the cooling system or failing to evaporate in the airstream. In one embodiment, the evaporative cooling system may be a turbine engine having a compressor with a plurality of turbine blades coupled to a rotatable disc and one or more ducts coupled to the compressor for directing air into the compressor. The evaporative cooling system may also include at least one fluid emitting device for spraying a cooling fluid into the duct. One or more electrodes may be positioned in the duct for applying an electrical charge to at least a portion of the plurality of droplets emitted by the at least one fluid emitting device. In one embodiment, the fluid emitting device may consist of one or more nozzles. The electrodes may be attached to or integrally formed in the nozzles. The fluid emitting devices may be capable of forming droplets having a Dv90 about 20 microns or less.

In other embodiments, the evaporative cooling system may include a baffle, which may be an acoustic baffle, positioned downstream of the fluid emitting devices. The baffle may be charged with an electrical charge having a polarity that is opposite to or the same as the electrical charge applied to the plurality of droplets. In embodiments where substantially all of the droplets have not evaporated before the droplets reach the baffle, the baffle may be charged with an electrical charge having a polarity that is opposite to the polarity of the charged particles. In this embodiment, the charged particles are attracted to the baffle. Substantially all, if not all, of the droplets are pulled from suspension in the air and adhere to surfaces of the baffles thus, preventing the droplets from entering the compressor. In embodiments where substantially all of the droplets have evaporated before the droplets reach the baffle, the baffle may be charged with an electrical charge having a polarity that is equal to the polarity of the charged particles. In this embodiment, the charged particles may be repelled from the baffles. What few droplets may be suspended in the air that pass through the baffles often evaporate before reaching the compressor. Thus, the air passing through the compressor has little, if any, droplets.

The evaporative cooling system may be operated by passing the cooling air through an inlet of the duct forming a portion of the evaporative cooling system. As the air enters the duct, the fluid emitting devices may spray a cooling fluid from one or more fluid emitting devices into the duct to form a plurality of droplets. An electrical charge may be applied to the plurality of droplets forming charged droplets. The charged droplets may be directed through the duct upstream of the compressor of a turbine engine. Operating the evaporative cooling system in this manner may cause substantially all of the plurality of charged particles to evaporate before reaching the compressor.

Applying an electrical charge to droplets to form charged droplets in the duct causes the droplets to repel from each other and prevents the droplets from agglomerating in the ducts. Thus, the evaporative cooling system substantially, if not completely, prevents droplets from agglomerating and settling on surfaces of the duct or other components of the evaporative cooling system. Rather, the evaporative cooling system advantageously forces the droplets to maintain their small size, which evaporate easier than larger droplets. Another advantage of this invention is that the evaporative cooling system prevents water droplets from entering the compressor and possibly damaging the blades of the compressor.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
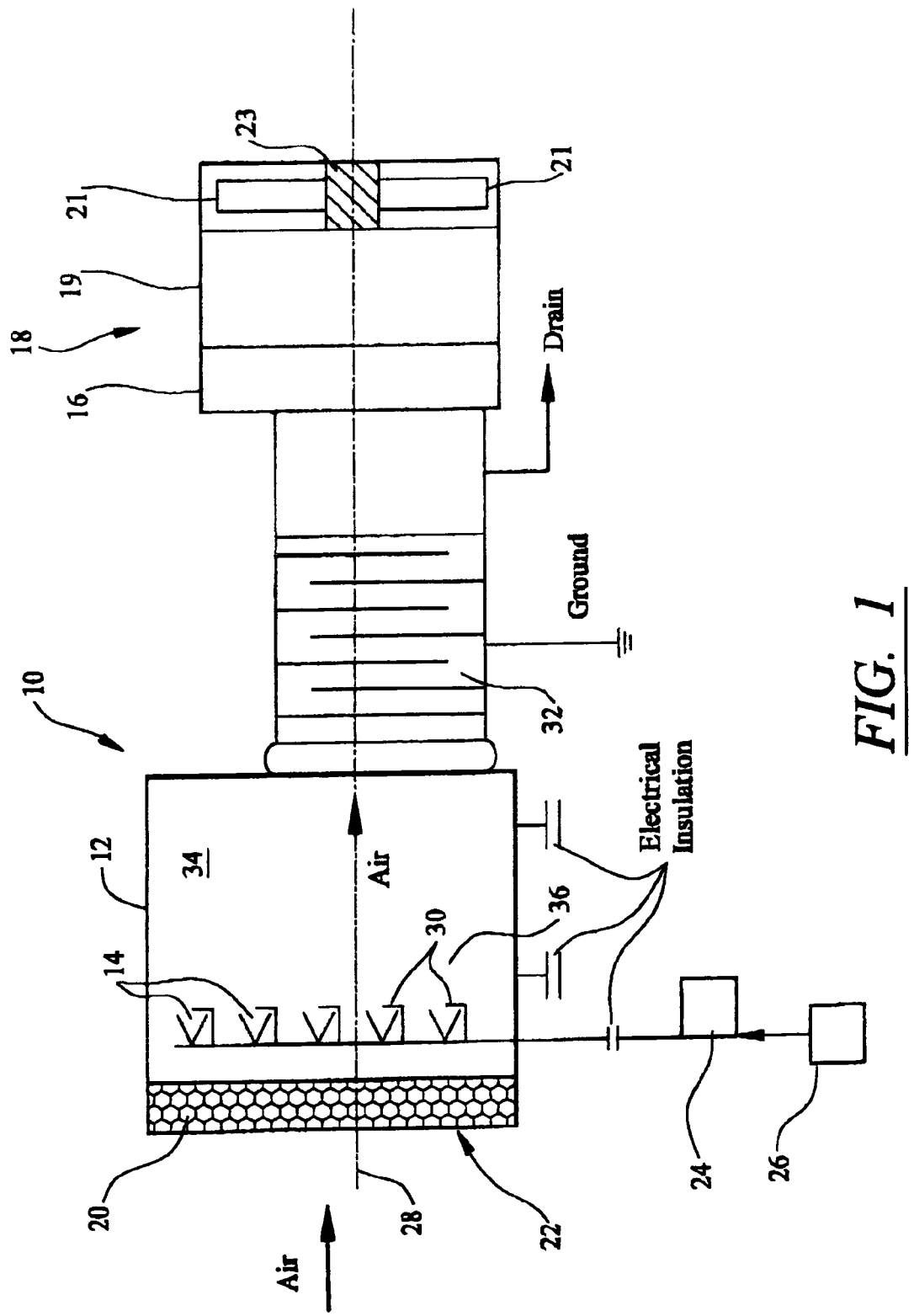
FIG. 1 is a schematic diagram showing various aspects of this invention.
Figure 2:
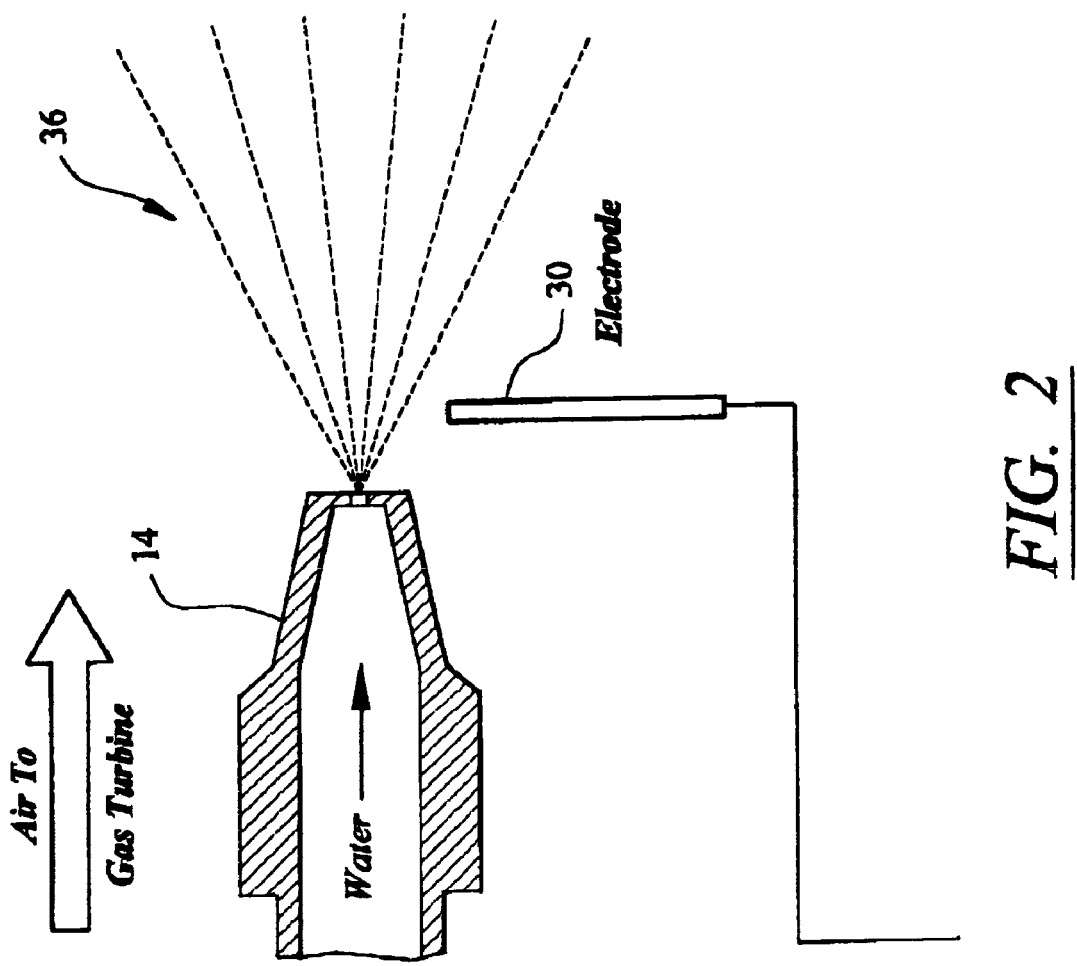
FIG. 2 is a schematic diagram of a fluid emitting device and an electrode of this invention.

This invention is directed to systems and methods for evaporating cooling fluids in intake airstreams before droplets of the cooling fluids, or at least a substantial portion of the droplets of cooling fluid, reach a compressor of a turbine engine. In particular, the evaporative cooling system, as shown in FIGS. 1–2, uses electrostatic forces to substantially prevent or limit droplets of a cooling fluid from either agglomerating and settling out of the intake airflow or failing to evaporate. Preventing droplets of a cooling fluid from agglomerating greatly increases the propensity of the droplets to evaporate before flowing into the combustor of a turbine engine.

As shown in FIG. 1, the evaporative cooling system 10 of this invention may be formed from one or more ducts 12 housing one or more fluid emitting devices 14. The duct 12 may be any duct capable of receiving an intake airstream and directing that airstream to a compressor 16 of a turbine engine 18. In at least one embodiment, the duct 12 may be a conventional filter-house of a turbine engine 18. The turbine engine 18 may also include a combustor 19 and a plurality of turbine blades 21 coupled to a rotatable disc 23. The duct 12 may be coated with a non-conductive coating so droplets of a cooling fluid suspended in an airstream flowing through the duct 12 are not drawn to the duct 12. A filter 20 may be positioned proximate to an inlet 22 of the duct 12 to filter particulate matter from the air. The filter may be any filter capable of filtering materials from the intake airstream.

In at least one embodiment, the duct 12 includes a plurality of fluid emitting devices 14. The fluid emitting devices 14 may be any devices capable of producing droplets of a fluid. In at least one embodiment, the fluid emitting devices 14 may be capable of producing droplets of a fluid having a Dv90 measurement less than about 50 microns, such as between 20 microns and 40 microns. In another embodiment, the fluid emitting devices 14 may be capable of producing droplets having a Dv90 measurement of less than or equal to about 20 microns. In other embodiments, the fluid emitting devices 14 may produce droplets having diameters larger than 50 microns.

In at least one embodiment, the fluid emitting devices 14 may be nozzles capable of producing a plurality of small droplets appearing as a fog. The fluid emitting devices 14 may be positioned to emit a cooling fluid generally parallel to a longitudinal axis 28 of the duct 12. The fluid emitting devices 14 may be positioned at regular intervals from each other in the duct 12 to produce droplets of cooling fluid without causing the droplets to agglomerate. Alternatively, the fluid emitting devices 14 may be arranged haphazardly spaced intervals in the duct 12.

The fluid emitting devices 14 may receive cooling fluids from a pump 24 and a cooling fluid supply source 26. The pump 24 may be any pump capable of pumping a cooling fluid to the fluid emitting devices 14. The cooling fluid supply source 26 may be any suitable source of cooling fluid. In at least one embodiment, the cooling fluid supply source 26 may be a container, a municipal water supply, or other source. In at least one embodiment, the cooling fluid supply source 26 may be a demineralized water system.

The evaporative cooling system 10 may also include one or more electrodes 30, as shown in FIGS. 1 and 2, for imparting an electrical charge on at least a portion of the droplets emitted from the fluid emitting devices 14. The electrodes 30 may be positioned in any location enabling the electrodes 30 to impart an electrical charge to the droplets of cooling fluid. In at least one embodiment, the electrodes 30 may be attached to the fluid emitting devices 14. For instance, in at least one embodiment, the electrodes 30 may be integrally formed with the nozzles forming the fluid emitting devices. The electrodes 30 may also be positioned in other locations as well.

The electrodes 30 may be used to impart an electrical charge to the fluid emitting devices 14 to substantially prevent the droplets of cooling fluid emitted by the fluid emitting devices 14 from agglomerating and precipitating out of the intake airstream. The charged droplets repel each other and may be repelled from an inside surface 34 of the duct 12. In another embodiment, an electrical charge sufficient to burst a water droplet into two or more smaller sized water droplets may be placed on the water droplets being emitted from the fluid emitting devices 14. The size of the charge may vary depending on the size of the water droplet. Thus, in at least one embodiment, charging the droplets prevents a substantial portion of the droplets from settling out of the intake airstream and settling on the inside surface 34 of the duct 12 or failing to evaporate.

The evaporative cooling system 10 may also include baffles 32, such as, but not limited to, silencing baffles, positioned downstream from the fluid emitting devices 14. The distance that baffles 32 are positioned downstream of the fluid emitting devices 14 may be determined by determining a target residence time for the droplets in the duct 12 before the droplets near the baffles 32. Thus, the position of the baffles 32 is a function of the flow rate of the intake airstream through the duct 12 and the Dv90 of the droplets, among other factors.

In at least one embodiment, the residence time of the droplets in the duct 12 may be such that substantially all of the droplets evaporate before the droplets reach the baffle 32. In this embodiment, the baffles 32, or the duct 12, or both, may be charged with an electrical charge having a polarity equal to the polarity of the charge of the droplets. As a result, any droplets remaining suspended in the air intake stream as the air passes through the baffles 32 may be repelled by the baffles 32 or duct 12, or both. At least a portion, if not all, of these droplets passing through the baffles 32 may evaporate before contacting blades in the compressor 16.

Alternatively, the residence time of the droplets in other embodiments of the evaporative cooling system 10 in the duct 12 may be such that evaporation of a substantial portion of the droplets in the duct 12 before the air reaches the compressor 16 is unlikely. In this embodiment, the baffles 32, or the duct 12, or both, may be charged with an electrical charge having a polarity that is opposite to the polarity of the charged droplets 36 or grounded. The oppositely charged baffles 32, or duct 12, or both, may cause the charged droplets 36 to be attracted to the baffles 32. As a result, a substantial portion, if not all, of the droplets suspended in the intake airstream may be pulled out of the intake airstream.

During operation, air is received through the inlet 22 of the duct 12. The air may be passed through duct 12 and baffles 32, if present, and into a compressor 16 of a turbine engine 18. As the air is passing through duct 12, a cooling fluid, which may be, but is not limited to, water, such as demineralized water, may be sprayed from at least one fluid emitting device 14 into the duct 12 to form a plurality of droplets. In at least one embodiment, the fluid emitting device 14 may emit a plurality of droplets having a Dv90 measurement less than about 20 microns. As the cooling fluid is emitted from at least one fluid emitting device 14, an electrical charge may be applied to the plurality of droplets forming charged droplets 36. The electrical charge may be greater than or equal to about 30,000 ohm-cm for demineralized water. The plurality of charged droplets 36 may be directed through the duct 12 upstream of a compressor 16 of a turbine engine 18 whereby substantially all of the plurality of charged droplets 36 evaporate before reaching the compressor 16. The charged particles repel each other and thereby do not agglomerate together. Evaporation of the droplets of cooling fluid reduces the temperature of the air flowing through the duct 12.

In one embodiment, an electrical charge may be applied to the baffles 32 or the duct 12, or both, while an electrical charge may be applied to the cooling fluid emitted from the fluid emitting devices 14. The electrical charge applied to the baffles 32 or the duct 12, or both, may have a polarity that is equal to a polarity of the electrical charge applied to the plurality of droplets emitted from the fluid emitting devices 14. In this embodiment, the charged particles 36 will be repelled from the baffles 32 or the duct 12, or both. In an alternative embodiment, an electrical charge having a polarity that is opposite to the polarity of the electrical charge applied to the plurality of droplets may be applied to the baffles 32 or the duct 12, or both. In this embodiment, the charged droplets 36 repel from each other and are attracted to the oppositely charged baffles 32 or the duct 12, or both. In at least one embodiment, the duct 12 may be grounded.

Determination of which system to be used may be determined using the methodology previously mentioned. In at least some embodiments, the charged droplets 36 will evaporate before reaching the baffles 32. Thus, the air entering the compressor 16 may be substantially, or completely, void of charged droplets 36. In other embodiments, the charged droplets 36 not evaporating before reaching the baffles 32 may plate out on the baffles 32 and produce air substantially, or completely, void of charged droplets 36.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A method of evaporating cooling fluids in a turbine engine, comprising:
   spraying a cooling fluid from at least one fluid emitting device into a duct, whereby a plurality of droplets is formed;
   applying an electrical charge to the plurality of droplets forming charged droplets; and
   directing the plurality of charged droplets through the duct upstream of a compressor of a turbine engine whereby substantially all of the plurality of charged droplets are evaporated before reaching the compressor.

2. The method of claim 1, further comprising applying an electrical charge to the duct, whereby the electrical charge applied to the duct has a polarity that is opposite to a polarity of the charge applied to the plurality of droplets.

3. The method of claim 1, further comprising applying an electrical charge to the duct, whereby the electrical charge applied to the duct has a polarity that is equal to a polarity of the charge applied to the plurality of droplets.

4. The method of claim 1, further comprising applying an electrical charge to at least one baffle positioned downstream from the at least one fluid emitting device.

5. The method of claim 4, wherein applying an electrical charge to at least one baffle comprises applying an electrical charge having a polarity that is opposite to a polarity of the electrical charge applied to the plurality of droplets if a residence time of the cooling fluids in the duct is not sufficient for a substantial portion of the plurality of droplets emitted into the duct to be evaporated before reaching the compressor of the turbine engine.

6. The method of claim 4, wherein applying an electrical charge to at least one baffle comprises applying an electrical charge having a polarity that is equal to a polarity the electrical charge applied to the plurality of droplets if a residence time of the cooling fluids in the duct is sufficient for a substantial portion of the plurality of droplets emitted into the duct to be evaporated before reaching the compressor of the turbine engine.

7. A turbine engine, comprising:
   a compressor having a plurality of turbine blades coupled to a rotatable disc;
   at least one duct coupled to the compressor for directing air into the compressor;
   at least one fluid emitting device for spraying a cooling fluid into the at least one duct, whereby a plurality of droplets are formed; and
   at least one electrode positioned in the duct for applying an electrical charge to at least a portion of the plurality of droplets.

8. The turbine engine of claim 7, further comprising at least one baffle positioned in the at least one duct downstream of the at least one fluid emitting device and upstream of the compressor.

9. The turbine engine of claim 8, further comprising at least one electrode coupled to the at least one baffle for applying an electrical charge to the at least one baffle.

10. The turbine engine of claim 7, further comprising at least one electrode coupled to the duct for applying an electrical charge to the duct.

11. The turbine engine of claim 7, wherein the at least one device for spraying a cooling fluid into the at least one duct comprises at least one nozzle adapted to emit droplets having a Dv90 measurement less than about 50 microns.

12. The turbine engine of claim 11, wherein the at least one device for spraying a cooling fluid into the at least one duct comprises at least one nozzle adapted to emit droplets having a Dv90 measurement less than about 20 microns.

13. The turbine engine of claim 7, wherein the duct is grounded.

14. An evaporative cooling system for a turbine engine, comprising:

at least one duct for directing air into a compressor of a turbine engine;

at least one fluid emitting device for spraying a cooling fluid into the at least one duct, whereby a plurality of droplets are formed;

at least one electrode positioned in the duct for applying an electrical charge to at least a portion of the plurality of droplets.

15. The evaporative cooling system of claim 14, further comprising at least one electrode coupled to the duct for applying an electrical charge to the duct.

16. The evaporative cooling system of claim 14, wherein the at least one fluid emitting device for spraying a cooling fluid into the at least one duct comprises at least one nozzle adapted to emit droplets having a Dv90 measurement less than about 50 microns.

17. The evaporative cooling system of claim 14, further comprising at least one baffle positioned in the at least one duct downstream of the at least one fluid emitting device and upstream of the compressor.

18. The evaporative cooling system of claim 17, further comprising at least one electrode coupled to the at least one baffle for applying an electrical charge to the at least one baffle.

19. The evaporative cooling system of claim 14, wherein the duct is grounded.

\* \* \* \* \*